(12) United States Patent
Gilder (10) Patent No.: US 9,104,759 B1
(45) Date of Patent: Aug. 11, 2015

(54) IDENTIFYING STEM VARIANTS OF SEARCH QUERY TERMS

(75) Inventor: Ariel E. Gilder, New York, NY (US)

(73) Assignee: Google Inc., Mountain View, CA (US)

( * ) Notice: Subject to any disclaimer, the term of this patent is extended or adjusted under 35 U.S.C. 154(b) by 437 days.

(21) Appl. No.: 13/350,564

(22) Filed: Jan. 13, 2012

(51) Int. Cl.
G06F 7/00 (2006.01)
G06F 17/30 (2006.01)

(52) U.S. Cl.
CPC ............................. *G06F 17/30864* (2013.01)

(58) Field of Classification Search
CPC .......... G06F 17/2795; G06F 17/30672; G06F 17/30864; G06F 17/3053; G06F 17/30598; G06F 17/30424
USPC .......... 707/711, 713, 728, 736, 758, 1/1, 737, 707/765–769, E17.014, 999.003, E17.017, 707/708, 721
See application file for complete search history.

(56) References Cited

U.S. PATENT DOCUMENTS

| | | | |
|---|---|---|---|
| 6,006,222 A * | 12/1999 | Culliss | 1/1 |
| 7,523,105 B2 * | 4/2009 | Wen et al. | 1/1 |
| 7,636,714 B1 | 12/2009 | Lamping et al. | |
| 2011/0145268 A1 * | 6/2011 | Agarwal | 707/765 |

OTHER PUBLICATIONS

Peng, F., et al., "Context Sensitive Stemming for Web Search", SIGIR 2007 Proceedings, Session 27, Domain Specific NLP, pp. 639-646 (Jul. 2007).
Riezler, S., et al., "Query Rewriting Using Monolingual Statistical Machine Translation", Association for Computational Linguistics, vol. X, No. X (May 2010).

* cited by examiner

*Primary Examiner* — Usmaan Saeed
*Assistant Examiner* — Cecile Vo
(74) *Attorney, Agent, or Firm* — Dority & Manning, P.A.

(57) ABSTRACT

The subject matter of this specification can be implemented in, among other things, a computer-implemented method for identifying and storing stem variants of search query terms. The method includes receiving a first query and a user selection of a first search result from the first query. The method further includes receiving a second query and a user selection of a second search result from the second query. The method further includes determining that the first search result and the second search result have the same category. The method further includes identifying a first term in the first query and a second term in the second query as stem variants of one another by determining that the first term is within a threshold edit distance of the second term. The method further includes storing the first term and the second term in a stem-variant repository.

20 Claims, 4 Drawing Sheets

IDENTIFYING STEM VARIANTS OF SEARCH QUERY TERMS

TECHNICAL FIELD

This instant specification relates to identifying stem variants of search query terms.

BACKGROUND

A word stem is a word that has multiple inflected variants. For example, the word "run" is a stem of the words "runs" and "running." Stemming is the process of identifying the stem of a word. The identified stem can then be used to identify other variants of the stem that may have similar meanings to or are synonymous with the original word. These variants with similar meanings can then be added, for example, as optional terms in a search query that includes the original word. This technique of adding optional terms from stem variants to a search query is sometimes referred to as query broadening.

SUMMARY

In one aspect, a computer-implemented method for identifying and storing stem variants of search query terms includes receiving a first query and a first user selection of a first search result responsive to the first query. The method further includes receiving a second query and a second user selection of a second search result responsive to the second query. The method further includes determining a first category for the first search result and a second category for the second search result. The method further includes determining that the first category and the second category are the same category. The method further includes identifying a first term in the first query and a second term in the second query as stem variants of one another by determining that the first term is within a threshold edit distance of the second term. The method further includes storing the first term and the second term in a stem-variant repository.

Implementations can include any, all, or none of the following features. The method can include receiving a third search query that includes the second term; using the stem variant repository to identify the first term as a stem variant of the second term; and using the first term to expand the third search query to include the first term and the second term. The first category and the second category can include a category of businesses. The method can include determining that the first search result has been selected a threshold number of times in response to the first search query and that the second search result has been selected the threshold number of times in response to the second search query. The method can include determining that the first term and the second term have a threshold number of characters in common. Determining that the first term and the second term have the threshold number of characters in common can include determining that the first term and the second term have a threshold number of initial characters in common. The method can include retrieving information, from one or more storage devices, that indicates the first user selection of the first search result in response to the first search query, the second user selection of the second search result in response to the second search query, the first category of the first search result, and the second category of the second search result. The method can include comparing the first term and the second term to results of another stemming algorithm to correct or supplement the results of the other stemming algorithm.

In one aspect, a computer-implemented system for identifying stem variants of search query terms includes one or more storage devices that store computer instructions. The system further includes one or more processors connected to the one or more storage devices and configured to execute the computer instructions stored thereon to receive a first query and a first user selection of a first search result for the first query. The one or more processors are further configured to execute the computer instructions to receive a second query and a second user selection of a second search result for the second query. The one or more processors are further configured to execute the computer instructions to determine a first category for the first search result and a second category for the second search result. The one or more processors are further configured to execute the computer instructions to determine that the first category for the first search result matches the second category for the second search result. The one or more processors are further configured to execute the computer instructions to determine that a first term in the first query is within a threshold edit distance of a second term in the second query. The one or more processors are further configured to execute the computer instructions to store the first term and the second term as stem variants of one another in a stem variant repository.

Implementations can include any, all, or none of the following features. The one or more processors can be further configured to execute the computer instructions to: receive a third query that includes the second term; use the stem variant repository to identify the first term as a stem variant of the second term; and use the first term to expand the third query to include the first term and the second term. The first category and the second category can include a category of businesses. The one or more processors can be further configured to execute the computer instructions to determine that the first search result has been selected a threshold number of times in response to the first query and that the second search result has been selected the threshold number of times in response to the second query. The one or more processors can be further configured to execute the computer instructions to determine that the first term and the second term have a threshold number of characters in common. The one or more processors can be further configured to execute the computer instructions to determine that the first term and the second term have a threshold number of initial characters in common. The one or more processors can be further configured to execute the computer instructions to compare the first term and the second term to results of another stemming algorithm to correct or supplement the results of the other stemming algorithm.

The details of one or more implementations are set forth in the accompanying drawings and the description below. Other features and advantages will be apparent from the description and drawings, and from the claims.

DETAILED DESCRIPTION

This document describes systems and techniques for expanding terms in a search query by identifying stem variants of the terms in the search query. The stem variants are identified from user selected search results, generated for multiple different search queries, that identify businesses that belong to the same business category. In particular, the stem variants are identified by determining that terms from different search queries, whose user selected search results are in the same business category, are within a threshold edit distance of one another. The identified stem variants can be stored and then used to broaden terms in subsequent search queries.

Figure 1:
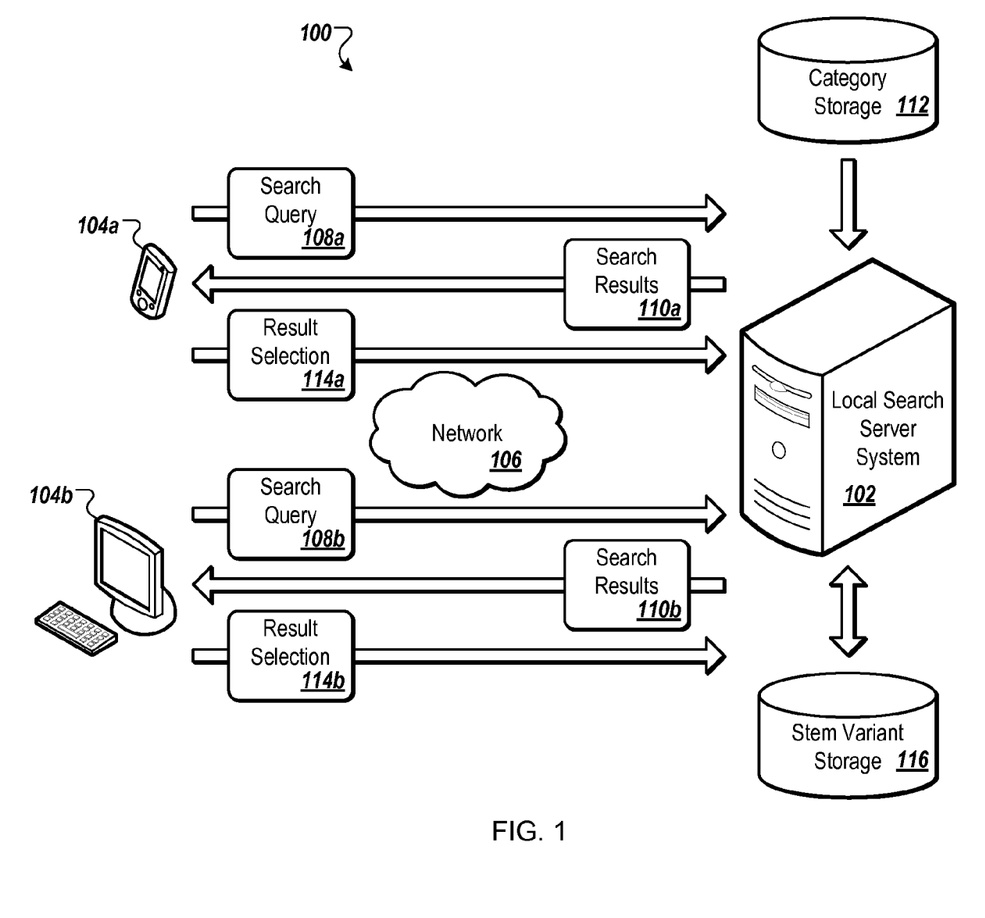
FIG. 1 is a schematic diagram that shows an example of a system for identifying stem variants of search query terms.

FIG. 1 is a schematic diagram that shows an example of a system 100 for expanding search query terms. The system 100 includes a local search server system 102 that receives local search queries from one or more client computing devices through a network 106. The client computing devices present user interfaces, such as web browser applications, to users of the client computing devices. The user interfaces at the client computing devices include a search tool, such as a search web page from the local search server system 102. For example, an interface at a first client computing device 104a can receive a first local search query 108a that includes the word "pizza." An interface at a second client computing device 104b can receive a second local search query 108b that includes the word "pizzeria." The first client computing device 104a and the second client computing device 104b send the received local search queries to the local search server system 102.

The local search server system 102 generates a set of search results for each local search query. Each search result is associated with a particular business, organization, or other local entity. For example, the local search server system 102 can generate a first set of search results 110a for the first local search query 108a that includes a search result for a business named "Luigi's Pizza House" as well as other search results that are responsive to the first local search query 108a. The local search server system 102 can generate a second set of search results 110b for the second local search query 108b that includes a search result for a business named "Mario's House of Pizza" as well as other search results that are responsive to the second local search query 108b.

Each local entity (e.g., a business or organization) identified in response to a local search query has an associated category. The categories can be stored in a category storage 112 or another system, such as within the local search server system 102. A category describes a type of entity, such as "hair salon," "hamburger restaurant," "hardware store," "high school," "Hindu temple," and "hotel." For example, the category storage 112 can include an association between a "pizza restaurant" category and both of the entities "Luigi's Pizza House" and "Mario's House of Pizza."

In some implementations, the categories are determined manually. For example, a business owner or another person can input category information for an entity that is then made available to the local search server system 102. In some implementations, the local search server system 102 or another system automatically identifies one or more categories for an entity by analyzing content and metadata from web pages or other online information that correspond to or reference the entity.

In response to receiving search results, users at client computing devices may select one or more of the search results to be directed to additional information for the associated entity, such as a web page for an organization or local business listing. For example, the first client computing device 104a can receive a first user selection 114a of the local search result for "Luigi's Pizza House" and the second client computing device 104b can receive a second user selection 114b of the search result for "Mario's House of Pizza."

In some implementations, the interface at the client computing device directs the user selection to the local search server system 102. The local search server system 102 can then provide the requested information or redirect the request to another system that can provide the information for the selected search result. In some implementations, the interface at the client computing device directs the user selection directly to another system that can provide the information for the selected search result while the user selection is also sent to the local search server system 102. For example, the interface can include client-side scripting that asynchronously sends the user selection to the local search server system 102. In another example, a plug-in to the interface or the interface itself can provide the user selection to the local search server system 102 either as the user selections occur or periodically in a batch.

The local search server system 102 accesses the category storage 112 to identify the categories of the received user selections. For example, the local search server system 102 can access the category storage 112 to determine that both the first user selection 114a for the "Luigi's Pizza House" search result and the second user selection 114b for the "Mario's House of Pizza" have a category of "pizza restaurant." In another example, the local search server system 102 can retrieve the categories at the time the search results are generated and can include the categories within the search results.

The local search server system 102 next determines whether the categories of the entities for the first user selection 114a and the second user selection 114b match. If they do, the local search server system 102 analyzes the edit distance between terms in the first local search query 108a and the second local search query 108b. The edit distance is the number of additions, deletions, and/or modifications that must be made to a first term to turn it into a second term. For example, the local search server system 102 determines that the edit distance between the term "pizza" from the first local search query 108a and the term "pizzeria" from the second local search query 108b is four. The "a" from "pizza" is changed to an "e" and the three letters "ria" are added to the end to change "pizza" into "pizzeria."

The local search server system 102 next determines whether the edit distance between "pizza" and "pizzeria" satisfies a threshold edit distance condition, such as an edit distance of less than or equal to four. In some implementations, another threshold edit distance condition can be used, such as less than five, or less than four. In some implementations, the local search server system 102 can use an alternative and/or additional threshold condition, such as whether a minimum number of matching characters and/or a minimum number of initial matching characters exist between a pair of search query terms. For example, the local search server system 102 can apply a condition that at least four of the initial characters in the search query terms match. The local search server system 102 determines that "pizza" and "pizzeria" satisfy this additional condition that four initial terms match by determining that both terms start with the four letters "pizz."

In some implementations, the local search server system 102 compares each search query as a whole to one or more other search queries as a whole in determining the edit distances between the search queries. Alternatively, the local search server system 102 can compare individual terms within two search queries to determine the edit distances between those terms. In some implementations, the local search server system 102 can omit some terms from the edit distance determination, such as terms that identify the query as being local. For example, a first query may include the terms "pizza nyc" and a second query may include the terms "pizzeria manhattan." The local search server system 102 can use the terms "nyc" and "manhattan" to identify the queries as local and to identify the particular location associated with the query. The local search server system 102 can then omit the location portion of the queries from the edit distance determination. As a result, the local search server system 102 identifies an edit distance between the terms "pizza" and "pizzeria," as before.

If the edit distance between two different search queries and/or between particular terms in two different search queries is less than a threshold, where each of the two different search queries produced search results that were selected by a user and classified under the same business category, then the two different search queries and/or particular terms in the two different search queries are identified by the local search server system 102 as stem variants. The local search server system 102 stores the identified stem variants in a stem variant storage 116.

In some implementations, the local search server system 102 waits to receive a threshold number of user selections and/or queries before identifying terms or phrases as stem variants of another. For example, the local search server system 102 may wait to receive fifty user selections of entities having a particular category, such as the "pizza restaurant" category, from the search results provided for both the "pizza" query and the "pizzeria" query before identifying the two terms as stem variants of one another.

In some implementations, the local search server system 102 analyzes multiple user selections from multiple search results produced in response to a particular query to determine the frequency with which those user selections identify businesses that can be classified to a particular category. The local search server system 102 can then apply a threshold frequency condition in addition to the threshold number of user selections before using the query to identify stem variants as discussed above. For example, the local search server system 102 can require that fifty percent or more of the user selections for the query identify business entities that are classified as within the particular category. In some implementations, the threshold frequency can be determined based on its proximity to the most frequently appearing category, such as within ten percent of the most frequently appearing category.

The local search server system 102 uses the stored stem variants to expand subsequent search queries. For example, the local search server system 102 can receive a subsequent search query that includes the term "pizza." The local search server system 102 looks up the terms from the subsequent search query in the stem variant storage 116 and determines that the "pizza" term has a stem variant that includes the term "pizzeria." The local search server system 102 expands the subsequent search query by including the term "pizzeria" as an alternative to the term "pizza" (e.g., "pizza pizzeria" or "pizza or pizzeria").

The local search server system 102 can also compare the identified stem variants to results obtained from another stemming algorithm. For example, another word stemming algorithm may be proficient at identifying singular stems from plural stem variants, such as by identifying the singular stem "pizza" from the stem variant "pizzas." In some implementations, the other stemming algorithm may not be proficient at identifying plural stem variants from a singular stem, such as by identifying the plural stem variant "pizzas" from the singular stem "pizza." The stem variants identified by the local search server system 102 can be used to correct or supplement stem variants identified by another stemming algorithm.

Figure 2:
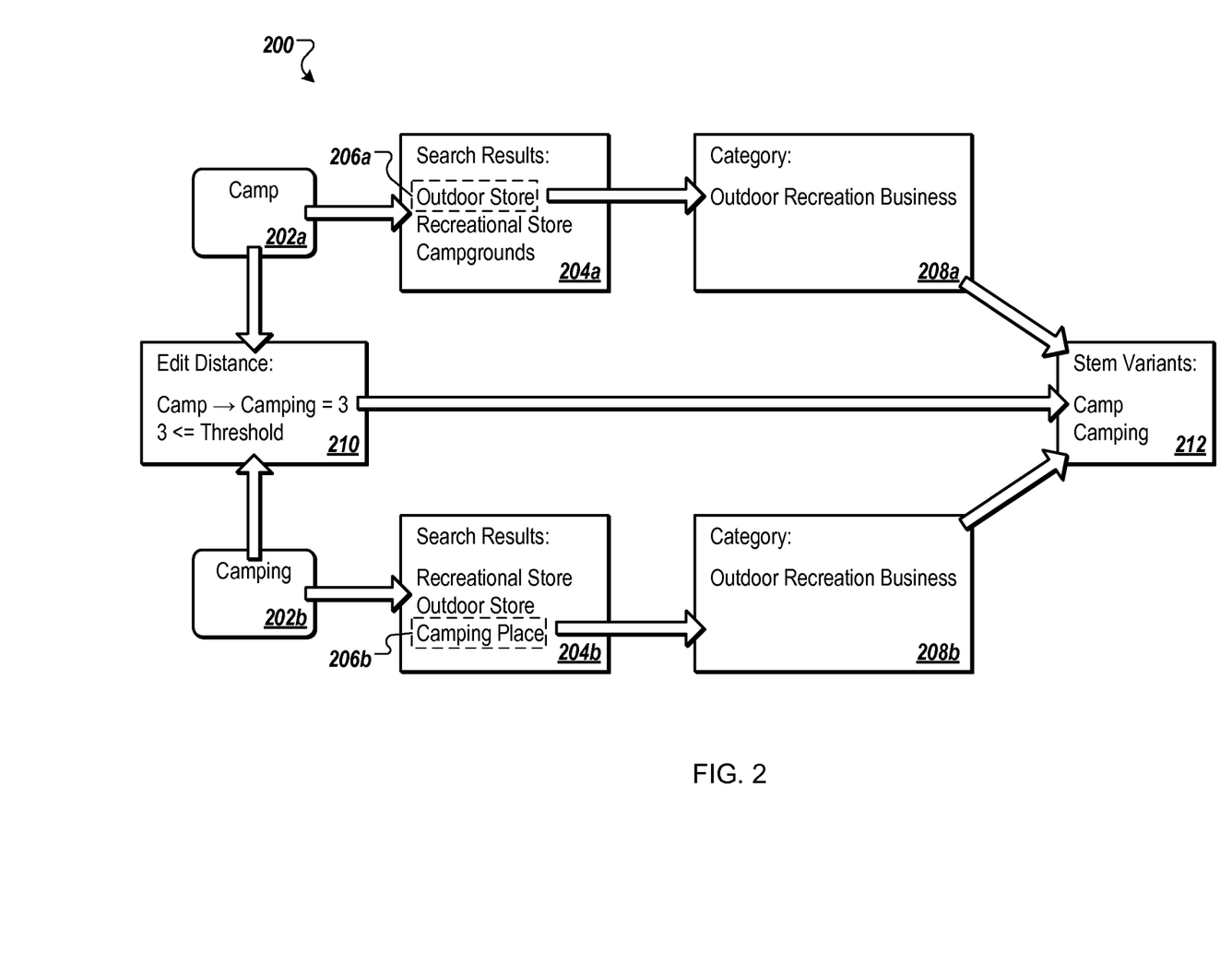
FIG. 2 is a block diagram that shows an example of a system for identifying stem variants of search query terms.

FIG. 2 is a block diagram that shows an example of a system 200 for identifying stem variants of search query terms. The system 200 receives a first local search query 202a from a first client computing device (e.g., a search query that includes the term "camp"), and a second local search query 202b from a second client computing device (e.g., a search query that includes the term "camping"). While the example shown here includes only two local search queries and describes only two computing devices, the system 200 can, in some implementations, process many more local search queries from many more computing devices and analyze user selections of search results provided in response to the local search queries. In some implementations, the search queries can be Internet based search queries sent from a web page form at a client computing device to a search system. In some implementations, the search queries can be requests sent from an application at a client computing device to a search system, such as a map application on a smartphone that communicates with a map and/or local search system.

The system 200 processes the first local search query 202a and provides one or more first search results 204a to the first client computing device. For example, the first search results 204a can include items responsive to the "camp" search term, such as businesses named "Outdoor Store" and "Recreational Store," and a "Campgrounds" organization. In addition, the system 200 processes the second local search query 202b and provides one or more second search results 204b to the second client computing device. For example, the second search results 204b can include items responsive to the "camping" search term, such as a businesses named "Recreational Store," "Outdoor Store," and "Camping Place."

The first client computing device receives a first user selection 206a, for example, a selection of the "Outdoor Store" item. The second client computing device receives a second user selection 206b, for example, a selection of the "Camping Place" item. In some implementations, each client computing device stores user selections at the respective client computing device for a period of time prior to sending a batch of search queries and user selections to a server system, such as the local search server system 102.

The system 200 determines an associated category 208a for the first user selection 206a, for example, a category of "Outdoor Recreation Business." The system 200 determines an associated category 208b for the second user selection 206b, for example, the same category of "Outdoor Recreation Business." Since the first user selection 206a and the second user selection 206b have the same category classifications, the system 200 determines an edit distance between the first local search query 202a and the second local search query 202b to which the first user selection 206a and the second user selection 206b were respectively responsive. For example, the system 200 determines that the term "camp" in the first local search query 202a has an edit distance 210 of three from the term "camping" in the second local search query 202b. The system 200 then determines whether the edit distance is less than a threshold, and if it is, the system 200 identifies the terms from the first local search query 202a and the second local search query 202b as stem variants of one another. For example, since the terms "camp" and "camping" have an edit distance of three, which is less than a threshold of four, the system 200 identifies the terms "camp" and "camping" as stem variants 212 of one another.

In some implementations, one or more search systems perform the operations of receiving search queries, generating search results, and/or receiving the user selection information. The search systems then provide the search query and user selection information to the system 200, which uses the information to identify stem variants of terms within the provided search queries. The system 200 can then provide the identified stem variants back to the search systems for use in expanding subsequently received search queries.

The search system and/or the system 200 can retrieve the search query and user selection information from logs at client computing devices that collect the search query and user selection information over time. In some implementations, the system 200 processes multiple sets of search queries and corresponding user selections from each log in a batch operation. The data in the logs can be made anonymous so that identities of the users requesting the search queries and selecting the search results cannot be determined. In addition, users can be provided with an option to opt in and/or opt out of the logging of such search data.

Figure 3:
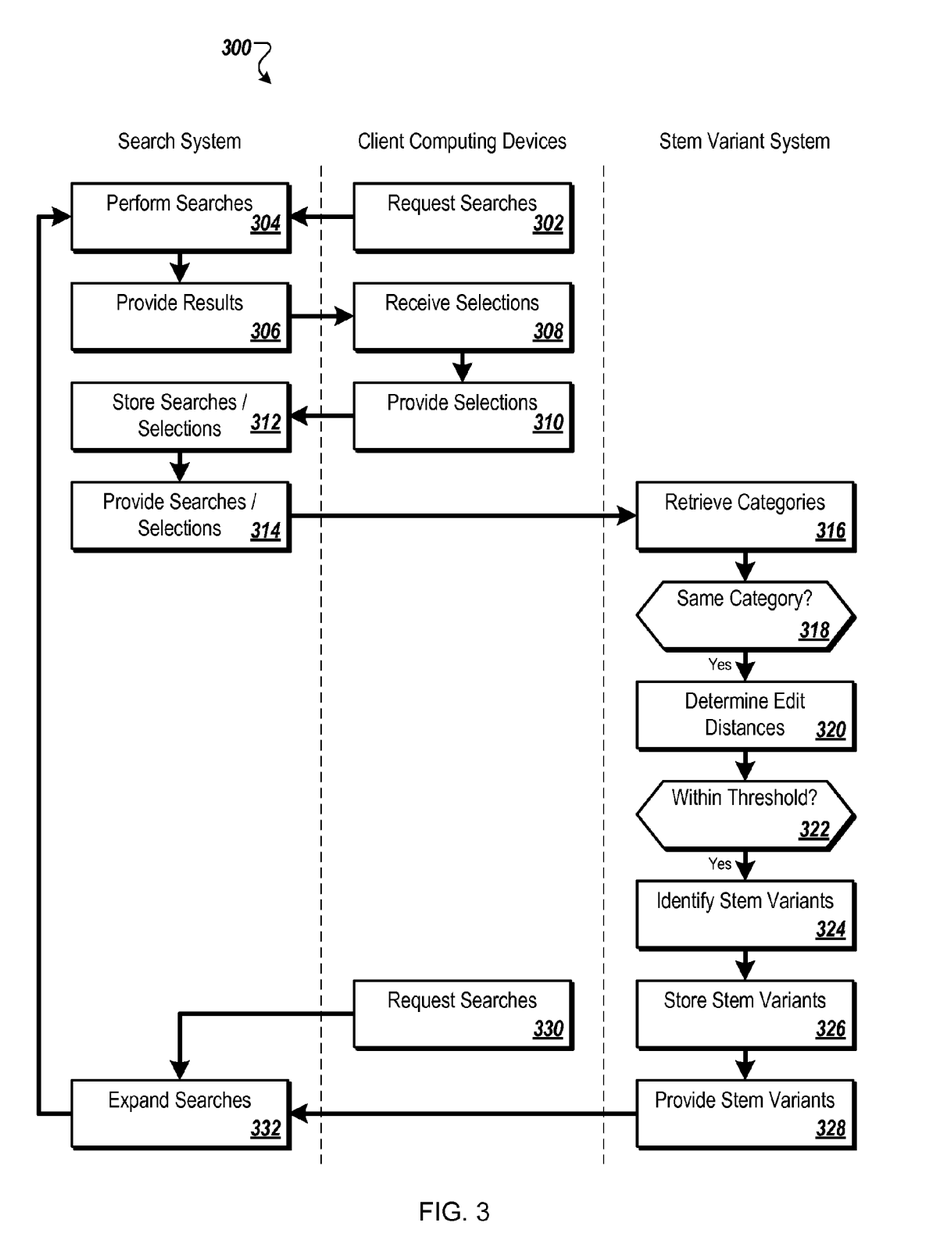
FIG. 3 is flow chart that shows an example of a process for identifying stem variants of search query terms.

FIG. 3 is a flow chart that shows an example of a process 300 for identifying stem variants of search query terms. The process 300 may be performed, for example, by a system such as the system 100. For clarity of presentation, the description that follows uses the system 100 as an example for describing the process 300. However, another system, or combination of systems, may be used to perform the process 300.

The process 300 begins with client computing devices sending (302) search queries to a search system. The search system receives the search queries and performs a search (304) based on each search query. The search system provides (306) a corresponding set of search results to the client computing devices. The client computing devices receive and display the search results, and receive (308) user selections of items in the search results. The client computing devices provide (310) the selections to the search system.

In some cases, a selection received at a client computing device may direct a web browser application at the client computing device to a website other than a website provided by the search system. In such cases, the web browser application or a plug-in to the web browser application sends a record of the user selection to the search system. In other cases, a selection received at a client computing may direct a local search application at the client computing device to a map location, a business review, or other information associated with a particular search result. In these cases, the local search application can send a record of the user selection to the search system.

The search system stores (312) the search queries and the associated user selections and provides (314) the search queries and the associated user selections to a stem variant system. The stem variant system retrieves (316) categories for the associated user selections. For example, the local search server system 102 can retrieve the categories from the category storage 112.

The stem variant system then determines (318) whether at least one user selected first search result responsive to a first query and at least one user selected second search result responsive to a second query have a same category. For example, the local search server system 102 can determine that the first user selection 114a of "Luigi's Pizza House" and the second user selection 114b of "Mario's House of Pizza" both have a category of "pizza restaurant." Similarly, the system 200 can determine that the "Outdoor Store" associated with the first user selection 206a and the "Camping Place" associated with the second user selection 206b both have the category of "Outdoor Recreation Business."

After determining that user selections to different search queries share the same categorical classification, the stem variant system calculates (320) edit distances for terms in the search queries. The stem variant system then determines (322) whether a first term in the first query is within a threshold edit distance of a second term in the second query. For example, the local search server system 102 can determine that "pizza" has an edit distance of four from "pizzeria," which is within a threshold edit distance of less than five. Similarly, the system 200 can determine that "camp" has an edit distance of three from "camping," which is also within the threshold edit distance of less than five. Other threshold edit distances can, of course, be used.

In some implementations, the process 300 performs the category and the edit distance determinations in either order and/or concurrently. In some implementations, the stem variant system only compares the edit distance between terms if the stem variant system has already determined that the corresponding user selections satisfy any category matching conditions. In another implementation, the stem variant system only compares the categories of user selections if the stem variant system has already determined that the edit distance between the corresponding terms are within any edit distance threshold conditions.

The stem variant system identifies (324) the first term and the second term as stem variants of one another in response to determining that the first term is within the threshold edit distance of the second term and that the first search result and the second search result have the same category. The stem variant system stores (326) the identification of the first term and the second term as stem variants of one another in a stem variant storage and provides (328) the stem variants to the search system.

One or more client computing devices send (330) subsequent search queries to the search system, such as a search query that includes the second term. The search system identifies stem variants of the second term (e.g., the first term), and uses (332) the stem variants (e.g., the first term) to expand the search query to include both the first and second terms. For example, the search system can expand a query that includes "camp" to also include the term "camping." The search system then performs (304) the expanded search.

Figure 4:
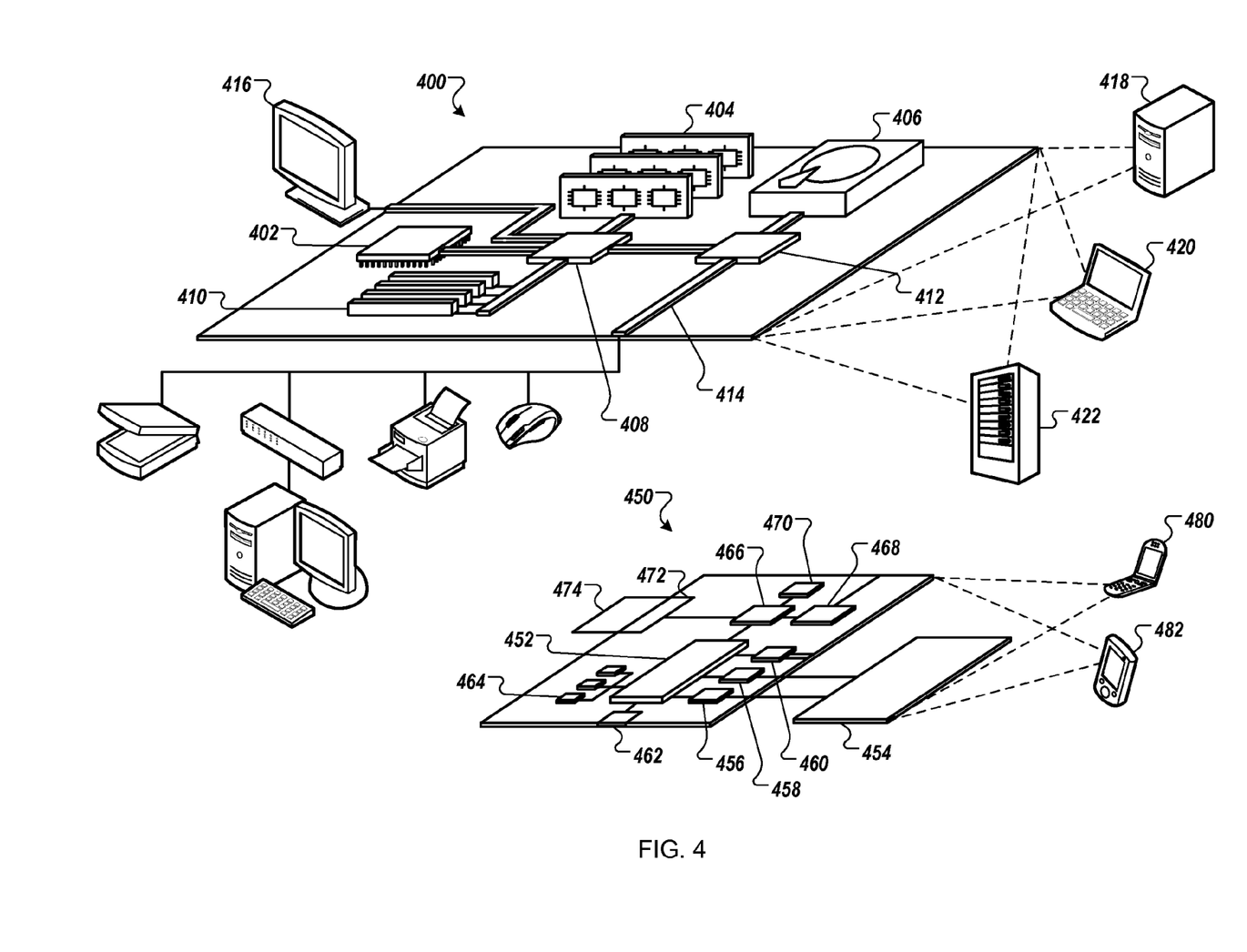
FIG. 4 is a schematic diagram that shows an example of a computing device and a mobile computing device.

FIG. 4 is a schematic diagram that shows an example of a computing device 400 and an example of a mobile computing device that can be used to implement the systems and techniques described here. The computing device 400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations.

A computer program product can be tangibly embodied in an information carrier. The computer program product may contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 418, or multiple times in a group of such servers. In addition, it may be implemented in a personal computer such as a laptop computer 420. It may also be implemented as part of a rack server system 422. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. The memory 464 may include, for example, flash memory and/or NVRAM memory (non-volatile random access memory).

An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a secure manner.

In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462 and stored in the computer- or machine-readable medium.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

For situations in which the systems discussed here use personal information about users, the users may be provided with an opportunity to opt in/out of programs or features that use personal information (e.g., information about a user's preferences, current location or previous location, search history, or search result selections). In addition, certain data may be made anonymous in one or more ways before it is stored or used, so that personally identifiable information is removed. For example, a user's identity may be made anonymous so that the no personally identifiable information can be determined for the user. In addition, a user's geographic location may be generalized where location information is obtained (such as to a city, zip code, or state level), so that a particular location of a user cannot be determined.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for identifying and storing stem variants of search query terms, the method comprising:

receiving, by one or more computing devices, a first query including one or more terms;

receiving, by the one or more computing devices, a first user selection of a first search result responsive to the first query;

receiving, by the one or more computing devices, a second query including one or more terms;

receiving, by the one or more computing devices, a second user selection of a second search result responsive to the second query;

determining, by the one or more computing devices, a first category for the first search result and a second category for the second search result, each category describing a type of organization entity;

determining, by the one or more computing devices, that the first category and the second category are the same category;

determining, by the one or more computing devices, that a threshold number of user selections have been made collectively for the first search result and the second search result;

identifying, by the one or more computing devices, a first term in the first query and a second term in the second query as stem variants of one another based at least in part on determining that the first category and the second category are the same category and on determining that a threshold number of user selections have been made collectively for the first search result and the second search result; and storing, by the one or more computing devices, the first term and the second term in a stem variant repository.

2. The method of claim 1, further comprising:

receiving, by the one or more computing devices, a third search query that includes the second term;

using, by the one or more computing devices, the stem variant repository to identify the first term as a stem variant of the second term; and expanding, by the one or more computing devices, the third search query to include the first term in addition to the second term to obtain a third search result.

3. The method of claim 1, wherein the first category and the second category comprise a category of businesses.

4. The method of claim 1, wherein the identifying a first term in the first query and a second term in the second query as stem variants of one another further comprises determining, by the one or more computing devices, that the first term is within a threshold edit distance of the second term, wherein the edit distance is the number of additions, deletions and modifications that must be made to characters in the first term to turn it into the second term.

5. The method of claim 1, wherein the identifying a first term in the first query and a second term in the second query as stem variants of one another further comprises determining, by the one or more computing devices, that the first term and the second term have a threshold number of characters in common.

6. The method of claim 5, wherein determining that the first term and the second term have the threshold number of characters in common comprises determining, by the one or more computing devices, that the first term and the second term have a threshold number of initial characters in common.

7. The method of claim 1, further comprising retrieving, by the one or more computing devices, information, from one or more storage devices, that indicates the first user selection of the first search result in response to the first search query, the second user selection of the second search result in response to the second search query, the first category of the first search result, and the second category of the second search result.

8. The method of claim 1, further comprising comparing, by the one or more computing devices, the first term and the second term identified as stem variants by a first stemming algorithm to results of a second stemming algorithm to correct or supplement second stem variants identified by the second stemming algorithm.

9. The method of claim 1, wherein the identifying the first and second terms as stem variants of one another further comprises determining that a threshold frequency of the first and second user selections identify organization entities that are classified as being within the determined same category.

10. The method of claim 9, wherein the threshold frequency is determined based on the proximity of the determined same category to the most frequently appearing category.

11. A computer-implemented system for identifying stem variants of search query terms, the system comprising:

one or more storage devices that store computer instructions; and one or more processors connected to the one or more storage devices and configured to execute the computer instructions stored thereon to:

receive a first query including one or more terms;

receive a first user selection of a first search result for the first query;

receive a second query including one or more terms;

receive a second user selection of a second search result for the second query;

determine a first category for the first search result and a second category for the second search result, each category describing a type of organization entity;

determine that the first category for the first search result matches the second category for the second search result;

determine that a first term in the first query is within a threshold edit distance of a second term in the second query, wherein the edit distance is the number of additions, deletions and modifications that must be made to characters in the first term to turn it into the second term;

identify the first term in the first query and the second term in the second query as stem variants of one another at least in part due to the determination that the first category for the first search result matches the second category for the second search result and the determination that the first term in the first query is within a threshold edit distance of the second term in the second query; and store the first term and the second term as stem variants of one another in a stem variant repository.

12. The system of claim 11, wherein the one or more processors are further configured to execute the computer instructions to:

receive a third query that includes the second term;

use the stem variant repository to identify the first term as a stem variant of the second term; and use the first term to expand the third query to include the first term and the second term.

13. The system of claim 12, wherein the first category and the second category comprise a category of businesses.

14. The system of claim 13, wherein determining that the first term is within a threshold edit distance of the second term comprises omitting location terms within the first query and the second query before determining the edit distance between the first term and the second term.

15. The system of claim 11, wherein identifying a first term in the first query and a second term in the second query as stem variants of one another further includes determining that the first term and the second term have a threshold number of characters in common.

16. The system of claim 11, wherein identifying a first term in the first query and a second term in the second query as stem variants of one another further includes determining that the first term and the second term have a threshold number of initial characters in common.

17. The system of claim 11, wherein the one or more processors are further configured to execute the computer instructions to compare the first term and the second term identified as stem variants by a first stemming algorithm to results of a second stemming algorithm to correct or supplement second stem variants identified by the second stemming algorithm.

18. A non-transitory machine-readable storage medium comprising machine readable instructions for causing one or more processors to execute a method for identifying and storing stem variants of search query terms, the method comprising:
- receiving a first query;
- receiving a first user selection of a first search result responsive to the first query;
- receiving a second query;
- receiving a second user selection of a second search result responsive to the second query;
- determining a first category for the first search result and a second category for the second search result, each category describing a type of organization entity;
- determining that the first category and the second category are the same category;
- determining that a threshold number of user selections have been made collectively for the first search result and the second search result;
- identifying a first term in the first query and a second term in the second query as stem variants of one another based at least in part on the determination that the first category and the second category are the same category and the determination that a threshold number of user selections have been made collectively for the first search result and the second search result; and
- storing the first term and the second term in a stem variant repository.

19. The non-transitory machine-readable storage medium of claim 18, wherein the identifying the first and second terms as stem variants of one another further comprises determining that the first term is within a threshold edit distance of the second term.

20. The non-transitory machine-readable storage medium of claim 18, further comprising determining that the first term and the second term have a threshold number of characters in common.

* * * * *